(12) United States Patent
Streffer

(10) Patent No.: US 10,577,245 B2
(45) Date of Patent: Mar. 3, 2020

(54) METHOD FOR PURIFYING PHOSPHORIC ACID

(71) Applicant: LXP Group GmbH, Marienwerder (DE)

(72) Inventor: Friedrich Streffer, Berlin (DE)

(73) Assignee: LXP GROUP GMBH, Marienwerder (DE)

(*) Notice: Subject to any disclaimer, the term of this patent is extended or adjusted under 35 U.S.C. 154(b) by 83 days.

(21) Appl. No.: 15/126,163

(22) PCT Filed: Jan. 16, 2015

(86) PCT No.: PCT/EP2015/050806
§ 371 (c)(1),
(2) Date: Sep. 14, 2016

(87) PCT Pub. No.: WO2015/144321
PCT Pub. Date: Oct. 1, 2015

(65) Prior Publication Data
US 2017/0081189 A1    Mar. 23, 2017

(30) Foreign Application Priority Data

Mar. 26, 2014 (EP) .................................. 14161685

(51) Int. Cl.
*C01B 25/234* (2006.01)
(52) U.S. Cl.
CPC .................. *C01B 25/234* (2013.01)
(58) Field of Classification Search
CPC .................................................... C01B 25/234
USPC ........................................................ 423/321
See application file for complete search history.

(56) References Cited

U.S. PATENT DOCUMENTS

| 3,318,661 A | 5/1967 | Schallert et al. |
| 3,903,247 A | 9/1975 | Blumberg et al. |
| 2011/0201096 A1 | 8/2011 | Streffer |

FOREIGN PATENT DOCUMENTS

| GB | 1240285 | * | 7/1971 |
| GB | 1240285 A | | 7/1971 |
| WO | WO 2010/043424 | * | 4/2010 |
| WO | WO-2010/043424 A1 | | 4/2010 |

OTHER PUBLICATIONS (Office Action ) Communication pursuant to Article 94(3) EPC, in European Application No. 14161685.4.
International Search Report and Written Opinion, PCT/EP2015/050806.
Chinese Office Action dated Sep. 29, 2018 and English translation, for corresponding Chinese Patent Application No. 201580015650.6.

* cited by examiner

*Primary Examiner* — Colleen P Dunn
(74) *Attorney, Agent, or Firm* — Polsinelli PC

(57) ABSTRACT

The present invention relates to a method for purifying phosphoric acid from a mixture which comprises organic compounds and water. In particular the present invention relates to a method for purifying phosphoric acid from a pulping slurry, containing or consisting of phosphoric acid, one or more organic compounds and water, comprising or consisting of the following steps:

i) providing a mixture containing or consisting of phosphoric acid, one or more substance(s) S having at least one secondary carbon atom attached to an alkoxy group, one or more (further) organic compounds and water, and
adjusting (if necessary) the molar ratio of phosphoric acid to the total of one or more substance(s) S, having at least one secondary carbon atom attached to an alkoxy group, in the mixture to be in the range of from 1:0.4 to 1:10, preferably to be in the range of approximately 1:0.6 to 1:4, especially preferably to be approximately 1:0.85 to 1:2, ii) heating the mixture to 25° C. or more until phase separation occurs, iii) removing the light phase, and iv) separating the phosphoric acid from the heavy phase.

17 Claims, No Drawings

METHOD FOR PURIFYING PHOSPHORIC ACID

CROSS-REFERENCE TO RELATED APPLICATIONS

This application is a national stage application (under 35 U.S.C. § 371) of PCT/EP2015/050806, filed Jan. 16, 2015, which claims benefit of European Application No. 14161685.4, filed Mar. 26, 2014, which are incorporated herein by reference in their entireties.

The present invention relates to a method for purifying phosphoric acid from a mixture which comprises organic compounds and water. Preferably, the present invention relates to a method for purifying phosphoric acid from a mixture comprising organic solvents as well as (polymeric) organic compounds, for example, a mixture derived from a pulping process.

Phosphoric acid is frequently used as a solvent for releasing polysaccharides from lignocellulosic material in pulping processes because it does not interfere with subsequent fermentation. Treatment of lignocellulose with concentrated phosphoric acid allows to separate cellulose and hemicellulose from lignin by dissolving the polysaccharides while the lignin remains undissolved. In most cases this step is followed by subsequent enzymatic or chemical hydrolysis and fermentation. After the process, the phosphoric acid is largely contaminated with organic solvents and monomeric and/or polymeric side products. Efficient recovery of clean phosphoric acid from a pulping slurry is challenging because of the diversity of the impurities. The required purification steps that need to be undertaken in order to be able to reuse the phosphoric acid and the associated high energy costs still pose a problem for industrial biorefineries.

Methods for the purification of phosphoric acid obtained from phosphate rock in a so-called wet process by extraction with organic solvents are described in U.S. Pat. Nos. 3,947,499 and 3,318,661.

In the wet process, phosphate rock is acidulated with a strong mineral acid such as sulphuric acid, hydrochloric or nitric acid. The primary object of the described methods is the removal of inorganic contaminations such as metal cations and silica, fluorine and sulfur compounds which are either released from the rock in the process or added in form of the mineral acid.

An excess of solvent, e.g. diisopropyl ether, is mixed with the wet process acid and purified phosphoric acid is extracted into the organic phase from which it is recovered by washing with water. The above mentioned patents disclose the formation of a solid compound or a liquid complex, respectively, between the diisopropyl ether and the phosphoric acid which facilitates the separation of the phosphoric acid from the undesired contaminations.

According to U.S. Pat. No. 3,318,661, phase separation occurs between an aqueous fraction containing the impurities and a complex layer when 68% to 85% $H_3PO_4$ is mixed with enough diisopropyl ether to form the liquid $H_3PO_4.H_2O.(CH_3)_2CHOCH(CH_3)_2$ complex in a slightly exothermic reaction. The optimum of $H_3PO_4$ recovery is reached when 85% $H_3PO_4$ is mixed with enough diisopropyl ether to form a maximum amount of complex without separating in a third phase of excess ether. The complex layer contains about 45% $H_3PO_4$, 8% $H_2O$ and 47% diisopropyl ether and can be separated by distillation. The separation can be improved by heating the complex layer to about 68° C. where roughly half of the diisopropyl ether separates to the top and can be drawn off. Alternatively, efficient separation of phosphoric acid from the diisopropyl ether is achieved, when just enough water is added to the complex layer to dilute the 85% of acid strength down to 68% or below, at which point the complex cannot exist anymore and the ether separates to the top. This process is endothermic and can therefore be controlled by temperature.

Extensive studies on the phase equilibria of the system water/phosphoric acid/diisopropyl ether at different temperatures have followed the discovery of the above described effects. Areas of one, two and three coexisting phases comprising aqueous, ether and complex phases are found depending on the composition and temperature. Ruiz et al. describe three phase regions at 25° C. and 40° C. in *Solvent Extraction and Ion Exchange*, 4 (4), 789-802 (1986). Harrison and Roquero observed three two-phase and one three phase zones at 0° C., 10° C. and 30° C. (*Journal of Chemical and Engineering Data*, 49 (2), 218-220 (2004)). The former study moreover indicates that the structural element of a secondary carbon atom attached to the ether oxygen may play a role in the efficiency of the complex formation and phase separation by comparing diisopropyl ether with a corresponding system comprising di-n-propyl-ether.

All of the above mentioned literature, however, exclusively focuses on the purification of wet process phosphoric acid but does not address the problem of removing organic impurities including organic solvents as well as non-solvent organic compounds and polymers from phosphoric acid.

A primary objective of the present invention was therefore to efficiently isolate phosphoric acid from mixtures comprising organic compounds.

A further objective of the present invention was to provide a simple and energy efficient way to purify phosphoric acid from a complex mixture comprising organic compounds and solvents.

In particular, it was an objective of the present invention to recover phosphoric acid of a sufficiently purity to be reused in subsequent processes from mixtures such as are obtained in a pulping process.

Due to the complexity of the system water/phosphoric acid/diisopropyl ether in terms of phase equilibria, it could not be expected that such systems would present a viable option to facilitate the purification of phosphoric acid from organic impurities and, in particular, apply the described effects to such complex mixtures as are obtained for example in a pulping process.

Surprisingly, however, the formation of a complex layer as described above and the observed temperature dependent phase separation may be implemented in a method for the purification of phosphoric acid from a mixture of organic compounds, polymers and solvents, significantly improving the energy efficiency with respect to conventional recovery processes.

The objectives as set out above are met by a method for purifying phosphoric acid from a mixture, in particular a pulping slurry, containing or consisting of phosphoric acid, one or more organic compounds and water, comprising or consisting of the following steps:
i) providing a mixture containing or consisting of phosphoric acid, one or more substance(s) S having at least one secondary carbon atom attached to an alkoxy group, one or more (further) organic compounds and water, and
adjusting (if necessary) the molar ratio of phosphoric acid to the total of one or more substance(s) S, having at least one secondary carbon atom attached to an alkoxy group, in the mixture to be in the range of from 1:0.4 to 1:10, preferably to be in the range of approximately 1:0.6 to 1:4, especially preferably to be approximately 1:0.85 to 1:2, ii) heating the mixture to 25° C. or more until phase separation occurs, iii) removing the light phase, and iv) separating the phosphoric acid from the heavy phase.

The starting mixture provided in step i) may comprise a plurality of organic compounds including monomeric, oligomeric and polymeric biomolecules as well as diverse organic solvents and precipitants.

The phosphoric acid to be purified may comprise or consist of a poly-phosphoric acid or a mixture of phosphoric acids. In this case the adjustment of the molar ratio is based on mono-phosphate unit equivalents.

Substance S represents an ether compound featuring the structural element of a secondary carbon atom attached to the bridging ether oxygen which has proved to be important for the efficient formation of the above described complex. One or more substance(s) S may already be among the organic compounds present in the starting mixture and thus be taken into account when adjusting the molar ratio of phosphoric acid to the total of substance(s) S. A mixture of different substances S does not hinder complex formation as long as the molar ratio requirements as set out above are met. Therefore, the adjustment can be performed by adding any kind of substance S or phosphoric acid to the mixture.

Unexpectedly, when the molar ratio of phosphoric acid to the total of substance(s) S is adjusted accordingly, spontaneous phase separation occurs at room temperature. A light organic phase comprising solvents and precipitants other than substance(s) S and only residual amounts of phosphoric acid is formed while the heavy phase constitutes the complex layer comprising the bulk phosphoric acid.

The presence of further organic compounds and polymers does not impede complex formation and phase separation. Consequently, the method can easily be integrated with hydrolysation, precipitation, extraction and fermentation steps, where other components of the mixture need to be processed or removed.

After the light organic phase is removed, the purified phosphoric acid can be recovered from the complex layer.

The separation of step iv) may be conducted by any suitable method such as distillation or extraction, e.g. with water.

In a preferred embodiment the separation of step iv) may be facilitated by heating the heavy phase to a temperature of 60° C. or more, preferably 65° C. or more, particularly preferably 68° C. or more and/or adding water to dilute the phosphoric acid strength to below 80%, preferably below 70%, particularly preferably below 68%.

As already described in the introduction, when heating the heavy phase which constitutes the complex layer, to a temperature of 68° C. and more, a large portion of substance(s) S separates off to the top. Moreover, at a dilution of below 68% phosphoric acid strength, the complex can not exist anymore and the substance(s) S separate(s) of to the top, where it can be drawn off. Both effects may thus be employed to simplify the recovery of the phosphoric acid from the heavy phase.

The method may further comprise the step v) of separating substance(s) S from the heavy phase.

As indicated above, substance(s) S may be separated by distillation from the heavy phase as well as by employing the temperature and/or dilution dependent phase separation effect, where the substance(s) S separate to the top and can be drawn off.

In a preferred embodiment of the method according to the invention, the substance(s) S obtained in step v) is reused in a further step i) as defined above.

The recycling of substance(s) S in a continuous process allows cost efficient use of the material and keeps the production of waste at a minimum.

The starting mixture provided in step i) of a method according to the invention may also comprise $CO_2$. $CO_2$ may be present in the starting mixture depending of the origin and previous processing steps of the starting mixture. For example, if the starting mixture originates from a pulping slurry, $CO_2$ may have been used as a lignin precipitant.

The (further) organic compound, or respectively, one, more or all of the (further) organic compounds present in the mixture provided in step i) of the method according to the invention may be selected from the group consisting of hydrocarbons, alcohols, aldehydes, ketones, acids, esters, ethers, carbohydrates, amino acids and derivates thereof as well as di-, tri-, oligo- or polymers thereof.

Depending on where the starting mixture provided in step i) of the method according to the invention originates from, a large diversity of organic compounds and solvents may be present. Previous processing including steps of dissolving, dilution, extraction or precipitation may have lead to the presence of large quantities of organic solvents and solvent mixtures of varying composition.

The (further) organic compound or, respectively, one, more or all of the (further) organic compounds may therefore be selected from the group consisting of organic solvents.

As mentioned above, the organic solvents may also include substance(s) S, but are not limited to any class of organic molecules and may exhibit different polarity and solubility. Unexpectedly, they do not infer with the formation of the complex and the phase separation.

Preferably, the (further) organic solvent(s) has/have a miscibility gap with water.

If the (further) organic solvent(s) exhibit a miscibility gap with water, the phase separation is facilitated and allows a more efficient recovery of phosphoric acid from the mixture.

Starting materials of previous processing of the mixture provided in step i) of the method according to the present invention may include any kind of biomass comprising macromolecules of biological origin such as lignin, cellulose, other oligo and polysaccharides, proteins and nucleic acids as well as their degradation products. Furthermore, enzymes or microorganisms may have been added, for example, in a digestion or fermentation step.

In a preferred embodiment of the method according to the invention, the (further) organic compound or, respectively, one, more or all of the (further) organic compounds may be selected from the group consisting of polysaccharides, oligosaccharides and hydrolysation products thereof.

In particular, the (further) organic compound or, respectively, one, more or all of the (further) organic compounds may be selected from the group consisting of cellulose, hemicellulose and lignin.

A primary advantage of the method according to the present invention is the fact that it may be applied to a mixture as derived from a pulping process, in which phosphoric acid has been used as a solvent. Pulping slurries generally comprise a large number of different organic compounds, solvents and (residual) polymers such as cellulose, hemicellulose and lignin, which complicate the efficient recovery of the phosphoric acid. The method according to the invention, however, provides a simple and energy efficient way to recover phosphoric acid from mixtures originating from a pulping slurry by employing effects, which have never been observed and could not have been expected to be of use in the context of pulping processes. In particular, it was not expected that the formation of the above described complex as well as the phase separation would not be impeded by the presence of a complex mixture of organic compounds, polymers and solvents.

In a method according to the invention, the substance(s) S may be selected from the group consisting of methyl-isopropyl ether, ethyl-isopropyl ether, propyl-isopropyl ether, di-isopropyl ether, sec-butyl-methyl ether, sec-butyl-ethyl ether, sec-butyl-propyl ether, sec-butyl-isopropyl ether, sec-butyl-butyl ether, bis(sec-butyl) ether, sec-butyl-tert.-butyl ether, 3-methoxy-pentane, 3-ethoxy pentane, 3-propoxy pentane, 3-(1-methyl-ethoxy)-pentane, 3-butoxy-pentane, 3-(2-methyl-propoxy)-pentane, 3-(1-methyl-propoxy)-pentane, 3-(1,1-methyl-ethoxy)-pentane, 3-pentoxy-pentane, 3-(1-methyl-butoxy)-pentane, 3-(2-methyl-butoxy)-pentane, 3-(3-methyl-butoxy)-pentane, 3-(1-ethyl-propoxy)-pentane, 3-(2-ethyl-propxy)-pentane, 2-methoxy-pentane, 2-ethoxy pentane, 2-propoxy pentane, 2-(1-methyl-ethoxy)-pentane, 2-butoxy-pentane, 2-(2-methyl-propoxy)-pentane, 2-(1-methyl-propoxy)-pentane, 2-(1,1-methyl-ethoxy)-pentane, 2-pentoxy-pentane, 2-(1-methyl-butoxy)-pentane, 2-(2-methyl-butoxy)-pentane, 2-(3-methyl-butoxy)-pentane, 2-(1-ethyl-propxy)-pentane, 2-(2-ethyl-propxy)-pentane, 2-methoxy-3-methyl-butane, 2-ethoxy-3-methyl-butane, 2-propoxy-3-methyl-butane, 2-(1-methyl-ethoxy)-3-methyl-butane, 2-butoxy-3-methyl-butane, 2-(2-methyl-propoxy)-3-methyl-butane, 2-(1-methyl-propoxy)-3-methyl-butane, 2-(1,1-methyl-ethoxy)-3-methyl-butane, 1-(3-methyl-butoxy)-pentane, 2-(1-methyl-butoxy)-3-methyl-butane, 2-(2-methyl-butoxy)-3-methyl-butane, 2-(3-methyl-butoxy)-3-methyl-butane, 2-(1-ethyl-propoxy)-3-methyl-butane, 2-(2-ethyl-propoxy)-3-methyl-butane.

The structural element of a secondary carbon atom attached to an alkoxy group is a feature present in many different ethers. Therefore, a large variety of compounds and compound mixtures may be used as substance(s) S in a method according to the invention to fulfill the requirements for complex formation with phosphoric acid and facilitate phase separation. As the ethers generally have a boiling point which is significantly different from phosphoric acid, they can easily be separated from the phosphoric acid and water by distillation once the complex has been isolated. Moreover, a phase separation between an aqueous phase comprising the phosphoric acid and an ether phase may be facilitated by heating the complex layer or dilution with water as described above. Once the ether separates to the top it may easily been drawn off and the purified phosphoric acid can be recovered from the complex.

In a preferred embodiment of the method according to the invention, the substance S or one of the substances S is diisopropyl ether.

As the liquid-liquid phase equilibrium of the ternary system water/phosphoric acid/diisopropyl ether has been extensively studied at various temperatures, it is especially easy to control the formation of the different two and three phase systems according to the determined experimental data if diisopropyl ether is used as substance S or as one of the substances S. Diisopropyl ether has furthermore been proven to be able to completely complex the phosphoric acid when adequate amounts are available in the mixture and thus to facilitate a maximum recovery of phosphoric acid after phase separation.

In a further preferred embodiment of the method according to the invention, the light phase formed in step ii) contains 10 wt.-% or less phosphoric acid.

When the phase separation occurs at the optimal conditions in terms of molar ratio between phosphoric acid and substance(s) S and temperature as set out above, it is possible to recover a maximum amount of phosphoric acid from the mixture. Thus, the light phase comprises little or no phosphoric acid at all.

In the method according to the invention, the mixture may be heated to 30° C. or more, preferably 40° C. or more, particularly preferably 50° C. or more in step ii).

Due to the temperature dependence of the phase composition, the portion of phosphoric acid in the heavy phase shifts towards a higher phosphoric acid content with increasing temperature. By heating the mixture to temperatures above room temperature the yield of phosphoric acid recovery may therefore be improved. In particular, the percentage of recovered phosphoric acid (PA) in the heavy phase may be described by $$\%PA = m_h * x_h(pa)/m_t * x_t(pa) \tag{1}$$

with $m_a$ denoting the masses of phases with a=t (total), h (heavy) and l (light) and $x_a(pa)$ the mass percentages of phosphoric acid in the corresponding phases. The mass of the heavy phase is assessable from the mass balance and the phase compositions $$m_h = (x_t(pa) - x_h(pa))/(x_l(pa) - x_h(pa)) * m_t \tag{2}.$$

Therefore the % PA may be expressed by the $x_t(pa)$ and the composition of the light and heavy phase:

$$\%PA = (x_t(pa) - x_h(pa))/(x_l(pa) - x_h(pa)) * x_h(pa)/x_t(pa) \tag{3}$$

Investigating the temperature dependence of the function (3) with the knowledge that the heavy phase shifts to high $x_h(pa)$ at higher temperatures (for DIPE/PA/H2O form 30% to 46% when the temperature rises from 0° C. to 40° C.) and that the light phase shifts to lower $x_l(pa)$ at higher temperatures (for DIPE/PA/H2O form 10% to 4% when the temperature rises from 0° C. to 40° C.), one finds that for a given $x_t(pa)$ the function has a minimum for intermediate temperatures and approximates 100% for low and high temperatures. At low temperatures approximately the whole mass is found in the heavy phase which is not favorable, whereas at high temperatures the mass is more evenly distributed between the light and heavy phase.

This qualitative behavior is not disrupted by (also larger) amounts of other solvent, but the minimum of the function at intermediate temperatures is shifted to higher temperatures by some degrees.

Step ii) of a method according to the invention may also be conducted under pressurized conditions.

Pressurized conditions may be applied to the system when conducting step ii) of the method according to the invention in order to prevent the solvents (including the substance(s) S) from evaporating when the mixture is heated. Thus, the composition of the mixture is kept constant and the phase equilibrium may be controlled.

In a further preferred embodiment of the method according to the invention, additional water may be added in step ii).

The addition of water during step ii) may also facilitate phase separation and improve recovery yield by shifting the composition of the mixture towards the region where maximum complex formation is possible.

The following examples are added to illustrate the method according to the invention without limiting the scope of protection.

EXAMPLE 1

A solution of 42 g phosphoric acid (85 wt %), 30 g ethanol and 5 g diisopropyl ether at room temperature. Instantaneously 4.7 g of a white substance crystallized and was filtered off.

Afterwards the filtrate was heated to 45° C. and a spontaneous phase separation occurred. The light, clear phase had a volume of 20 ml and a phosphoric acid content of 5 wt %. Further heating to 65° C. enlarged the light phase to 45 ml while the content of phosphoric acid was reduced to 2 wt %.

EXAMPLE 2

A solution of 42 g phosphoric acid (85 wt %), 38 g ethyl acetate und 7 g cellobiose was admixed with 46 g diisopropyl ether at room temperature. Instantaneously 6.8 g of a white substance crystallized and was filtered off.

Afterwards the filtrate was heated to 40° C. and a spontaneous phase separation occurred. The light, clear phase had a volume of 15 ml and a phosphoric acid content of 6 wt %. Further heating to 65° C. enlarged the light phase to 65 ml.

EXAMPLE 3

A solution of 42 g phosphoric acid (85 wt %), 34 g acetone und 10 g lignin was admixed with 46 g sec-butyl-isopropyl ether at room temperature. Instantaneously 6.8 g of a white substance crystallized and was filtered off.

Afterwards the filtrate was heated to 45° C. and a spontaneous phase separation occurred. The light, clear phase had a volume of 45 ml and a phosphoric acid content of 5.4 wt %.

The invention claimed is:

1. A method for purifying phosphoric acid from a mixture comprising phosphoric acid, one or more organic compounds, and water, the method comprising:
   i) providing a mixture comprising:
      phosphoric acid,
      one or more substance(s) S having at least one secondary carbon atom attached to an alkoxy group, wherein one or more substance(s) S is/are selected from the group consisting of methyl-isopropyl ether, ethyl-isopropyl ether, propyl-isopropyl ether, di-isopropyl ether, sec-butyl-methyl ether, sec-butyl-ethyl ether, sec-butyl-propyl ether, sec-butyl-isopropyl ether, sec-butyl-butyl ether, bis(sec-butyl) ether, sec-butyl-tert.-butyl ether, 3-methoxy-pentane, 3-ethoxy pentane, 3-propoxy pentane, 3-(1-methyl-ethoxy)-pentane, 3-butoxy-pentane, 3-(2-methyl-propoxy)-pentane, 3-(1-methyl-propoxy)-pentane, 3-(1,1-methyl-ethoxy)-pentane, 3-pentoxy-pentane, 3-(1-methyl-butoxy)-pentane, 3-(2-me-thyl-butoxy)-pentane, 3-(3-methyl-butoxy)-pentane, 3-(1-ethyl-propxy)-pen-tane, 3-(2-ethyl-propxy)-pentane, 2-methoxy-pentane, 2-ethoxy pentane, 2-propoxy pentane, 2-(1-methyl-ethoxy)-pentane, 2-butoxy-pentane, 2-(2-me-thyl-propoxy)-pentane, 2-(1-methyl-propoxy)-pentane, 2-(1,1-methyl-eth-oxy)-pentane, 2-pentoxy-pentane, 2-(1-methyl-butoxy)-pentane, 2-(2-me-thyl-butoxy)-pentane, 2-(3-methyl-butoxy)-pentane, 2-(1-ethyl-propxy)-pen-tane, 2-(2-ethyl-propxy)-pentane, 2-methoxy-3-methyl-butane, 2-ethoxy-3-methyl-butane, 2-propoxy-3-methyl-butane, 2-(1-methyl-ethoxy)-3-methyl-butane, 2-butoxy-3-methyl-butane, 2-(2-methyl-propoxy)-3-methyl-butane, 2-(1-methyl-propoxy)-3-methyl-butane, 2-(1,1-methyl-ethoxy)-3-methyl-bu-tane, 1-(3-methyl-butoxy)-pentane, 2-(1-methyl-butoxy)-3-methyl-butane, 2-(2-methyl-butoxy)-3-methyl-butane, 2-(3-methyl-butoxy)-3-methyl-butane, 2-(1-ethyl-propxy)-3-methyl-butane, 2-(2-ethyl-propxy)-3-methyl-butane,
   a pulping slurry comprising one or more organic solvents and one or more organic compounds selected from the group consisting of polysaccharides, oligosaccharides, and hydrolysation products thereof, and
   one or more further organic compounds selected from the group consisting of a further organic solvent, water, and a mixture thereof, and
   adjusting the molar ratio of phosphoric acid to the total of the one or more substance(s) S, having at least one secondary carbon atom attached to an alkoxy group, in the mixture to be in the range of from 1:0.4 to 1:10,
   ii) heating the mixture to a temperate of at least 25° C. and maintaining the temperature of at least 25° C. until phase separation occurs,
   iii) removing a light phase, and
   iv) purifying the phosphoric acid from a heavy phase by extraction or distillation.

2. The method according to claim 1, further comprising:
   v) separating the one or more substance(s) S from the heavy phase obtained in iv).

3. The method according to claim 2, wherein the one or more substance(s) S obtained in v) is reused in i).

4. The method according to claim 1, wherein the mixture provided in i) contains $CO_2$.

5. The method according to claim 1, wherein the one or more organic compounds is/are selected from the group consisting of cellulose, hemicellulose, and lignin.

6. The method according to claim 1, wherein the one or more substance S comprises di-isopropyl ether.

7. The method according to claim 1, wherein the light phase formed in ii) contains 10 wt.-% or less phosphoric acid.

8. The method according to claim 1, wherein the mixture is heated to at least 30° C. and maintained at this temperature until phase separation occurs ii).

9. The method according to claim 1 ii) is conducted under pressurized conditions and/or wherein additional water is added in ii).

10. The method according to claim 1 comprising adjusting the molar ratio of phosphoric acid to the total of the one or more substance(s) S, having at least one secondary carbon atom attached to an alkoxy group, in the mixture to be in the range of 1:0.6 to 1:4.

11. The method according to claim 1 comprising adjusting the molar ratio of phosphoric acid to the total of the one or more substance(s) S, having at least one secondary carbon atom attached to an alkoxy group, in the mixture to be in the range of approximately 1:0.85 to 1:2.

12. The method according to claim 1, wherein the mixture is heated to at least 40° C. and maintained at this temperature until phase separation occurs in ii).

13. The method according to claim 1, wherein the mixture is heated to at least 50° C. and maintained at this temperature until phase separation occurs in ii).

14. The method according to claim 2, wherein the one or more substance S comprises di-isopropyl ether.

15. A method for purifying phosphoric acid comprising:
i) providing a mixture comprising:
- phosphoric acid,
- diisopropyl ether,
- a pulping slurry comprising organic solvents and one or more organic compounds selected from the group consisting of polysaccharides, oligosaccharides, and hydrolysation products thereof,
- one or more further organic compounds selected from the group consisting of a further organic solvent, water, and a mixture thereof, and
- adjusting the molar ratio of the phosphoric acid to the diisoprpoyl ether in the mixture to be from 1:0.85 to 1:2, ii) heating the mixture to a temperate of at least 40° C. and maintaining the temperature of at least 40° C. until phase separation occurs, iii) removing a light phase comprising 10 wt. % or less of phosphoric acid, iv) purifying the phosphoric acid from a heavy phase by extraction or distillation; and v) separating the diisopropyl ether from the heavy phase.

16. The method according to claim 15, wherein ii) is conducted under pressurized conditions.

17. The method according to claim 16, wherein additional water is added in ii).

* * * * *